United States Patent
Hogan et al.

(10) Patent No.: US 12,252,351 B2
(45) Date of Patent: Mar. 18, 2025

(54) SYSTEMS AND METHODS FOR PACKAGE SIZE DETECTION

(71) Applicant: FMH Conveyors LLC, Jonesboro, AR (US)

(72) Inventors: William Mark Hogan, Virginia Beach, VA (US); Daniel Lee Bonsack, Jonesboro, AR (US); Andrew Young, Bono, AR (US)

(73) Assignee: FMH Conveyors LLC, Jonesboro, AR (US)

( * ) Notice: Subject to any disclaimer, the term of this patent is extended or adjusted under 35 U.S.C. 154(b) by 190 days.

(21) Appl. No.: 18/066,350

(22) Filed: Dec. 15, 2022

(65) Prior Publication Data

US 2023/0192414 A1 Jun. 22, 2023

Related U.S. Application Data

(60) Provisional application No. 63/290,213, filed on Dec. 16, 2021.

(51) Int. Cl.
*B65G 43/08* (2006.01)
*G01B 11/04* (2006.01)

(52) U.S. Cl.
CPC ............ *B65G 43/08* (2013.01); *G01B 11/043* (2013.01); *G01B 11/046* (2013.01)

(58) Field of Classification Search
CPC ...... B65G 43/08; G01B 11/043; G01B 11/046
See application file for complete search history.

(56) References Cited

U.S. PATENT DOCUMENTS

| | | | | |
|---|---|---|---|---|
| 3,278,048 A | * | 10/1966 | Bruce | B65G 69/00 |
| | | | | 414/794.3 |
| 4,576,071 A | * | 3/1986 | Rayment | B26D 5/32 |
| | | | | 83/365 |

(Continued)

OTHER PUBLICATIONS

SICK Sensor Intelligence, "Measuring automation light grids MLG-2", <https://www.sick.com/dk/en/automation-light-grids/measuring-automation-light-grids/mlg-2/mlg05a-0895r10501/p/p361955>, available online at least as early as Nov. 2021, 3 pages.

*Primary Examiner* — Gene O Crawford
*Assistant Examiner* — Lester Rushin, III
(74) *Attorney, Agent, or Firm* — Michael Best & Friedrich LLP

(57) ABSTRACT

An exemplary method for monitoring a package on a conveyor may include emitting a plurality of infrared beams, detecting one or more of the emitted infrared beams, calculating a package height using the detected infrared beams, determining whether the package height exceeds a predetermined threshold, and when the package height meets or exceeds the predetermined threshold, sending a signal indicating a height of the package exceeds the predetermined threshold. A package size detector may include a transmitter including a plurality of light sources and positioned on a first side of a conveyor, and a receiver positioned on a second, opposite side of the conveyor, including a plurality of light sensors, each of the plurality of light sensors being configured to detect light emitted from the plurality of light sources. A controller may be configured to determine whether a package height exceeds a predetermined threshold.

12 Claims, 8 Drawing Sheets

(56) References Cited

U.S. PATENT DOCUMENTS

| | | | | |
|---|---|---|---|---|
| 5,469,262 A * | 11/1995 | Keen | .................... | G01B 11/04 |
| | | | | 356/627 |
| 7,417,440 B2 * | 8/2008 | Peschmann | ............ | G01R 27/06 |
| | | | | 324/637 |
| 9,544,075 B2 * | 1/2017 | Altman | .................... | H04W 4/06 |
| 11,195,254 B2 * | 12/2021 | Zhou | ......................... | G06T 5/50 |
| 11,485,533 B1 * | 11/2022 | Hoffman | ................. | B65B 5/028 |
| 11,860,292 B2 * | 1/2024 | Eberspach | ............ | G01S 7/4816 |

\* cited by examiner

SYSTEMS AND METHODS FOR PACKAGE SIZE DETECTION

CROSS-REFERENCE TO RELATED APPLICATION(S)

The present application is related to, and claims the priority benefit of, U.S. Provisional Patent Application No. 63/290,213, filed on Dec. 16, 2021, the entire contents of which are incorporated herein by reference.

INTRODUCTION

Telescopic conveyors may be used to load or unload packages. Telescopic conveyors usually include a fixed base section and at least one extensible section that telescopes relative to the base section. A conveyor belt runs a length of a top surface and typically is operable at various speeds.

In some instances, raised belt transfers may be used on telescopic conveyors to raise the belt above the conveyor slider bed so the belt may mate up to an incline/takeaway conveyor positioned over the telescopic conveyor. The telescopic belt may loop through a series of pulleys on traditional raised belt transfers.

SUMMARY

In one embodiment, a method for monitoring a package on a conveyor is disclosed. The method includes emitting a plurality of infrared beams, detecting one or more of the emitted infrared beams, calculating a package height using the detected infrared beams, determining whether the package height exceeds a predetermined threshold, and when the package height meets or exceeds the predetermined threshold, sending a signal indicating a height of the package exceeds the predetermined threshold.

In another embodiment, a package size detector for a monitoring size of a package on a conveyor is disclosed. The package size detector includes a transmitter positioned on a first side of the conveyor. The transmitter includes a plurality of light sources, wherein each of the plurality light sources is configured to emit a light. The package size detector also includes a receiver positioned on a second, opposite side of the conveyor. The receiver includes a plurality of light sensors, each of the plurality of light sensors being configured to detect light emitted from the plurality of light sources. A controller stores instructions that, when executed by the controller, cause the controller to determine whether a package height exceeds a predetermined threshold and send a signal if the package height meets or exceeds the predetermined threshold.

In yet another embodiment, a package handling system includes a conveyor including a first side, a second side opposite the second side, a slider bed extending between the first side and the second side, a conveyor belt at least partially supported by and movable relative to the slider bed, and a controller. The system also includes a detector for monitoring a size of a package on a conveyor. The detector includes a transmitter positioned on a first side of the conveyor. The transmitter includes a plurality of light sources, wherein each of the plurality light sources is configured to emit a light. The detector also includes a receiver positioned on a second, opposite side of the conveyor. The receiver includes a plurality of light sensors, each of the plurality of light sensors being configured to detect light emitted from the plurality of light sources. A controller of the detector stores instructions that, when executed by the controller, cause the controller to determine whether the package exceeds a predetermined threshold that corresponds to a maximum package height and send a signal if a height of the package meets or exceeds the predetermined threshold.

In yet another embodiment, a package size detector for a monitoring size of a package on a conveyor is disclosed. The detector includes a transmitter positioned on a first side of the conveyor, a receiver positioned on a second, opposite side of the conveyor, a light curtain including a plurality of light beams extending between the transmitter and the receiver, and a controller configured to store a predetermined threshold that corresponds to a maximum package height and send a signal indicating a height of the package meets or exceeds the predetermined threshold. In some embodiments, the light curtain includes a plurality of infrared light beams that are parallel to one another.

Other aspects of the technology will become apparent by consideration of the detailed description and accompanying drawings.

Figure 1:
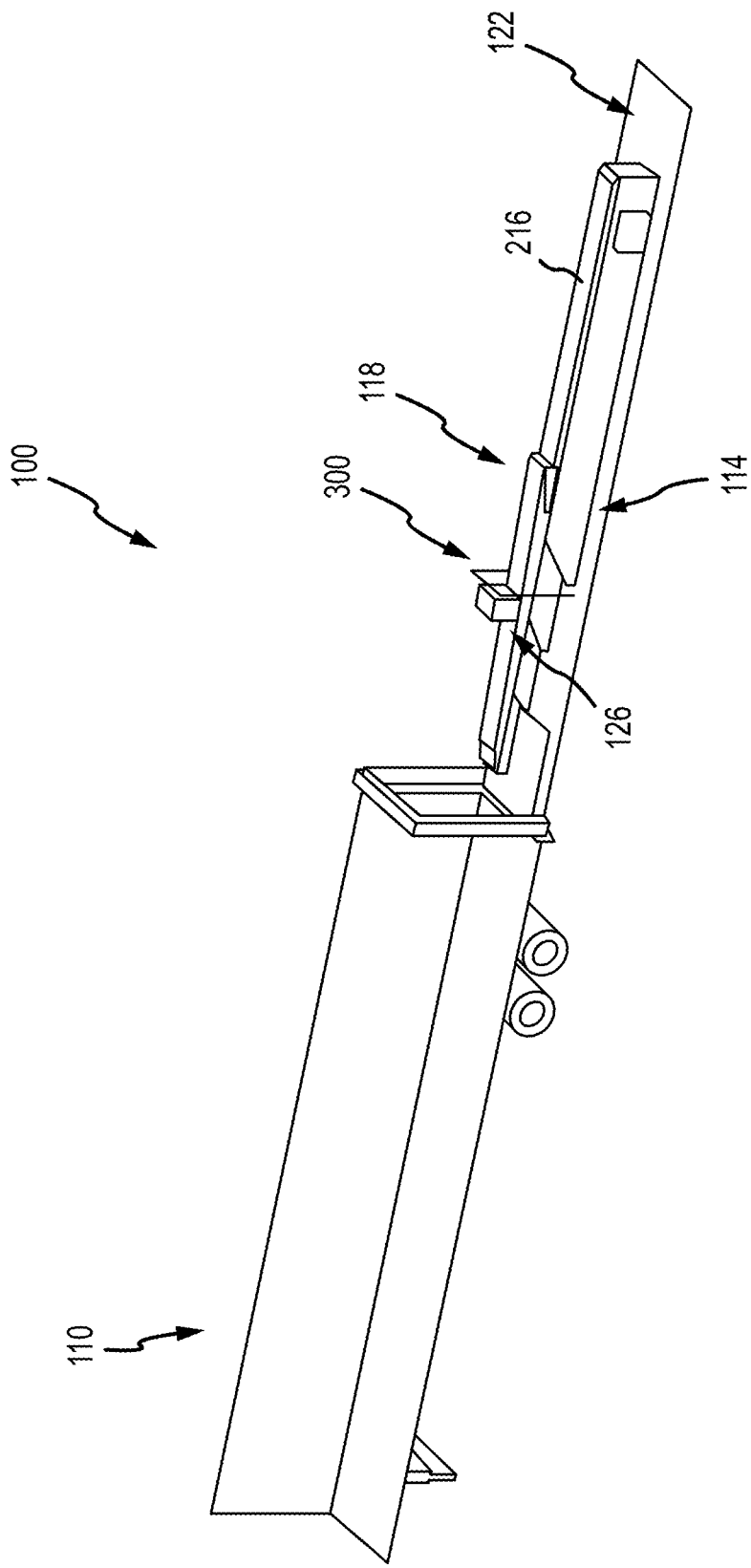
FIG. 1 is a schematic depiction of an exemplary package handling system including, among other things, a telescopic conveyor and package size detector according to an embodiment of the disclosure.

Before any embodiments of the disclosure are explained in detail, it is to be understood that the present disclosure is not limited in its application to the details of construction and the arrangement of components set forth in the following description or illustrated in the following drawings. The present disclosure is capable of other embodiments and of being practiced or of being carried out in various ways.

Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, aspects may be implemented in software (for example, stored on non-transitory computer-readable medium) executable by one or more processing units, such as a microprocessor, an application specific integrated circuits ("ASICs"), or another electronic device. As such, it should be noted that a plurality of hardware and software-based devices, as well as a plurality of different structural components may be utilized to implement the technology. For example, "controllers" described in the specification may include one or more electronic processors or processing units, one or more computer-readable medium modules, one or more input/output interfaces, and various connections (for example, a system bus) connecting the components.

DETAILED DESCRIPTION

Generally, instantly disclosed systems and methods are directed to monitoring package size. Existing package size monitoring techniques may involve mechanical apparatus or trip sensors, which are used to determine whether a package transported by a conveyor is oversized. However, in certain conveyor implementations, the belt may rise off the conveyor bed, for instance, when the belt passes through a raised belt transfer unit. Existing mechanical apparatus or trip sensors do not account for situations where a height of the belt from the conveyor bed changes during operation. A height of a conveyor belt may vary based on numerous factors, for instance, a quantity and/or a weight of packages on the belt at a given time. Exemplary systems and methods disclosed and contemplated herein may be configured to identify oversized packages where a height of the belt from the conveyor bed changes during operation.

FIG. 1 is a schematic depiction of an exemplary package handling system 100. The system 100 includes a load/unload site 110, a telescopic conveyor 114, a raised belt transfer unit 118, and a load/unload site 122. In some instances, exemplary system 100 further includes a second conveyor positioned adjacent telescopic conveyor 114. Other embodiments can include more or fewer components. For example, the raised belt transfer unit 118 and/or the second conveyor may be omitted. The package handling system and the components thereof (e.g., the telescopic conveyor 114, the raised belt transfer unit, etc.) illustrated herein are merely exemplary, and the package handling system and the components thereof may have other configurations or other or additional features than those described below and shown in the drawings.

In various implementations, the telescopic conveyor 114 may be manufactured with raised belt transfer unit 118. In some instances, the raised belt transfer unit 118 may be attached to telescopic conveyor 114 as an aftermarket modification.

In an exemplary implementation, a package 126 can be unloaded from the load/unload site 110 and provided to the telescopic conveyor 114. The package 126 is conveyed by the telescopic conveyor 114 to the raised belt transfer unit 118. In turn, the raised belt transfer unit 118 provides the package 126 to the second conveyor. Then the second conveyor may provide the package 126 to the load/unload site 122.

In some implementations, the package 126 may be conveyed in the opposite direction: from the load/unload site 122 to the second conveyor, from the second conveyor to the raised belt transfer unit 118, from the raised belt transfer unit 118 to the telescopic conveyor 114, and from the telescopic conveyor 114 to the load/unload site 110. In various implementations, the second conveyor may be relatively level or an inclined conveyor.

In various implementations, the load/unload site 110 may be a fixed or a movable load site. As an example, and as shown in FIG. 1, the load/unload site 110 may be a trailer of a semi-truck. In various implementations, the load/unload site 122 may be a fixed or movable load site. As examples, the load/unload site 122 may be a storage facility, warehouse, fulfillment center, or distribution facility. Other possibilities are contemplated.

In a typical implementation, the load/unload site 110 is positioned relatively lower than the load/unload site 122. Accordingly, the package 126 unloaded from the load/unload site 110 travels relatively upwards via the telescopic conveyor 114, the raised belt transfer unit 118, and the second conveyor. Conversely, when the package 126 is provided starting from the load/unload site 122, the package 126 may travel relatively downward.

Figure 2:
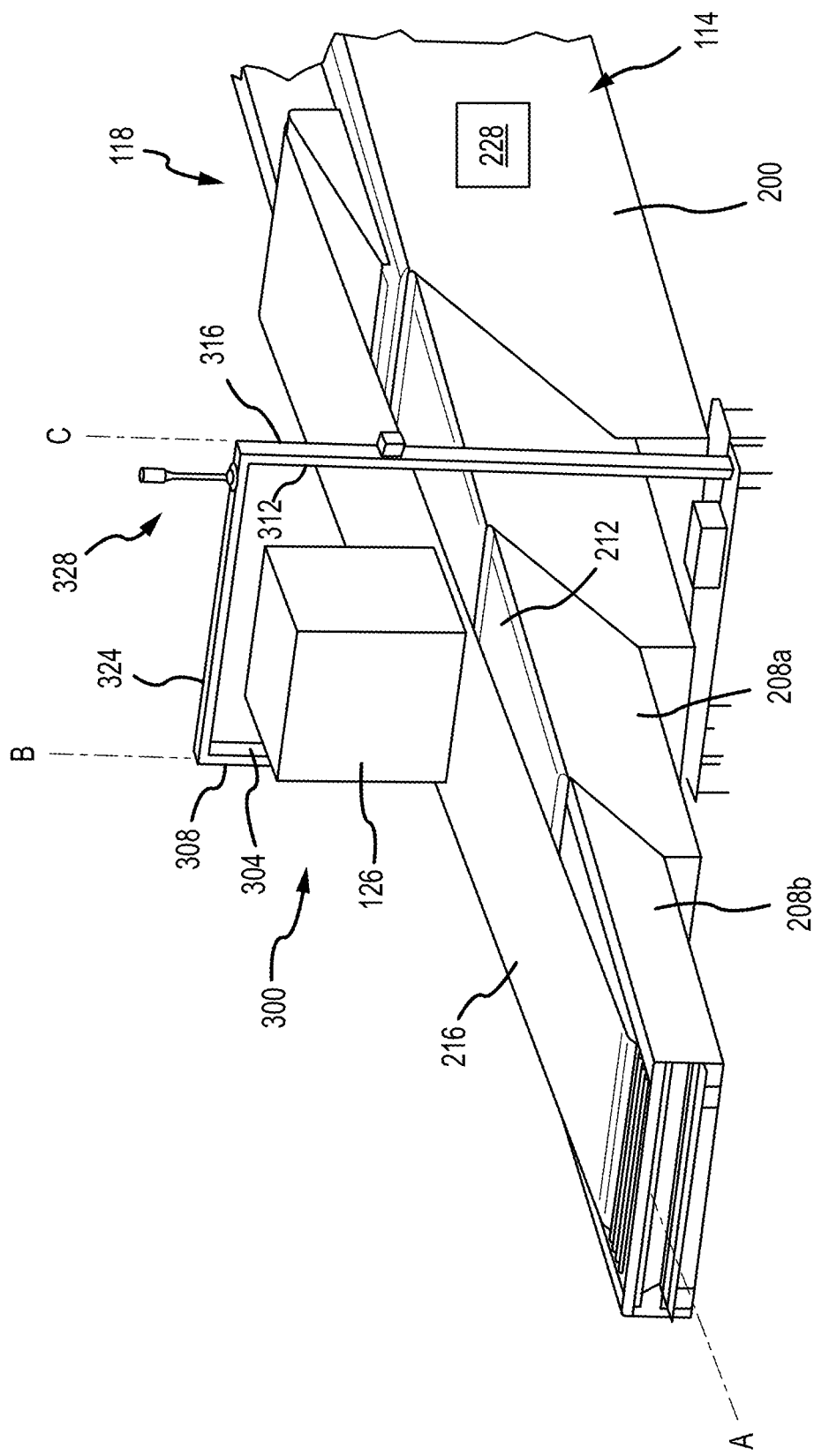
FIG. 2 illustrates a perspective view of the package size detector of FIG. 1.
Figure 3:
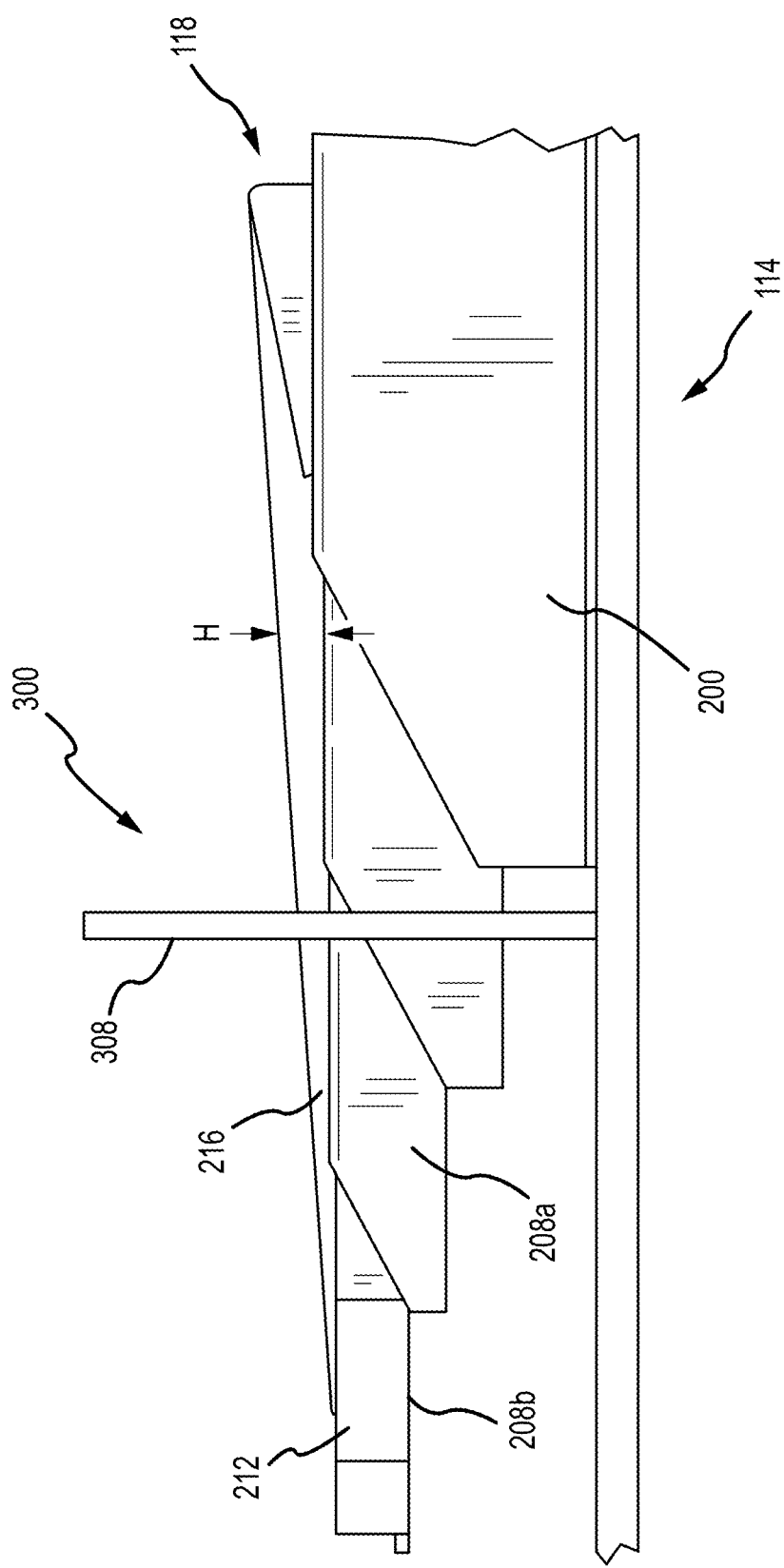
FIG. 3 illustrates a detailed side view of the package size detector of FIG. 1.

With respect to FIGS. 1-3, an exemplary telescopic conveyor 114 is shown. The illustrated telescopic conveyor 114 includes a base stage 200 (e.g., a non-moving stage) supported by a support surface and one or more telescopic stages 208a, 208b that are movable or telescopic relative to the base stage 200 and one another. Exemplary support surfaces may include a floor of a storage facility, warehouse, fulfillment center, or distribution facility. As shown, each of the stages 200, 208a, 208b define a portion of a slider bed 212.

The illustrated telescopic conveyor 114 further includes a conveyor belt 216 that transports the package 126 along the slider bed 212. Generally, the slider bed 212 is the surface, or surfaces, of telescopic conveyor 114 that support the conveyor belt 216. Depending on the extended position of the telescopic conveyor 114, the slider bed 212 may comprise more than one stage 200, 208a, 208b of telescopic conveyor 114. That is, the telescopic conveyor 114 includes a retracted position and one or more non-retracted positions.

In the retracted position, none of the telescopic stages 208a, 208b extend from the base stage 200 and therefore the slider bed 212 defines a first minimum dimension (e.g., a first length). In non-retracted positions, one or more of the telescopic stages 208a, 208b extend from the base stage 200 and/or from the adjacent telescopic stage 208a, 208b and therefore the slider bed 212 defines a second dimension (e.g., a second length) that is greater than the first length. In some embodiments, the length by which the slider bed 212 of the telescopic conveyor 114 is extendable by is approximately 17 meters.

The telescopic stages 208a, 208b of the telescopic conveyor 114 may be moved between the retracted and extended positions via one or more motors (not shown), such as a hydraulic motor or an electric motor. The slider bed 212 is therefore movable parallel to a plane A (FIG. 2), which in the illustrated embodiment is generally parallel to the support surface, between the retracted and one or more non-retracted positions. Moreover, although not shown, the slider bed 212 may be movable relative to a support surface among a plurality of heights via one or more lift actuators (not shown) such that the plane A is oriented at different angles relative to the support surface. The telescopic conveyor 114 includes a controller 228 (FIG. 2) that is in communication with the conveyor belt 216 and the one or more motors and lift actuators.

The raised belt transfer unit 118 may be used to raise the conveyor belt 216 of the telescopic conveyor 114 above the slider bed 212 so that it may mate up to the second conveyor that may be positioned over or otherwise adjacent to the telescopic conveyor 114. The height H of conveyor belt 216 (FIG. 3) relative to the slider bed 212 may vary based on the location of the raised belt transfer unit 118, the weight and type of belting materials, the weight of the individual packages, the distribution of the packages on the belt, and the centering of the packages on the conveyor belt 216. Accordingly, the conveyor belt 216 establishes a floating reference point, rather than a fixed reference point. In other words, during operation, the height H of the conveyor belt 216 at a given location along the slider bed 212 may vary. Generally, the height H of the conveyor belt 216 increases as the conveyor belt 216 approaches the raised belt transfer unit 118.

A package size detector 300 is shown in FIGS. 1-8 as well. The package size detector 300 includes a transmitter 304 supported on a first support member 308 and a receiver 312 supported on a second support member 316. Although not shown, in other embodiments, the transmitter 304 and the receiver 312 may be supported on a single support member. In the illustrated embodiment, the transmitter 304 and the receiver 312 are electrically coupled to one another via a hard-wired connection 320. In some embodiments, the transmitter 304 and the receiver 312 may be electrically coupled to one another via a wireless connection.

A connecting member 324 (FIG. 2) may be coupled between the first support member 308 and the second support member 316. In some embodiments, the connecting member 324 may be omitted. A status indicator 328 (FIG. 2) may be supported by the first support member 308, the second support member 316, or the connecting member 324. In the illustrated embodiment, the status indicator 328 is a stack light that has a light that is selectively illuminated. In other or additional embodiments, the status indicator 328 may be an auditory alarm that selectively emits a sound. In still other or additional embodiments, the status indicator 328 may be both a stack light and an auditory alarm.

Figure 4:
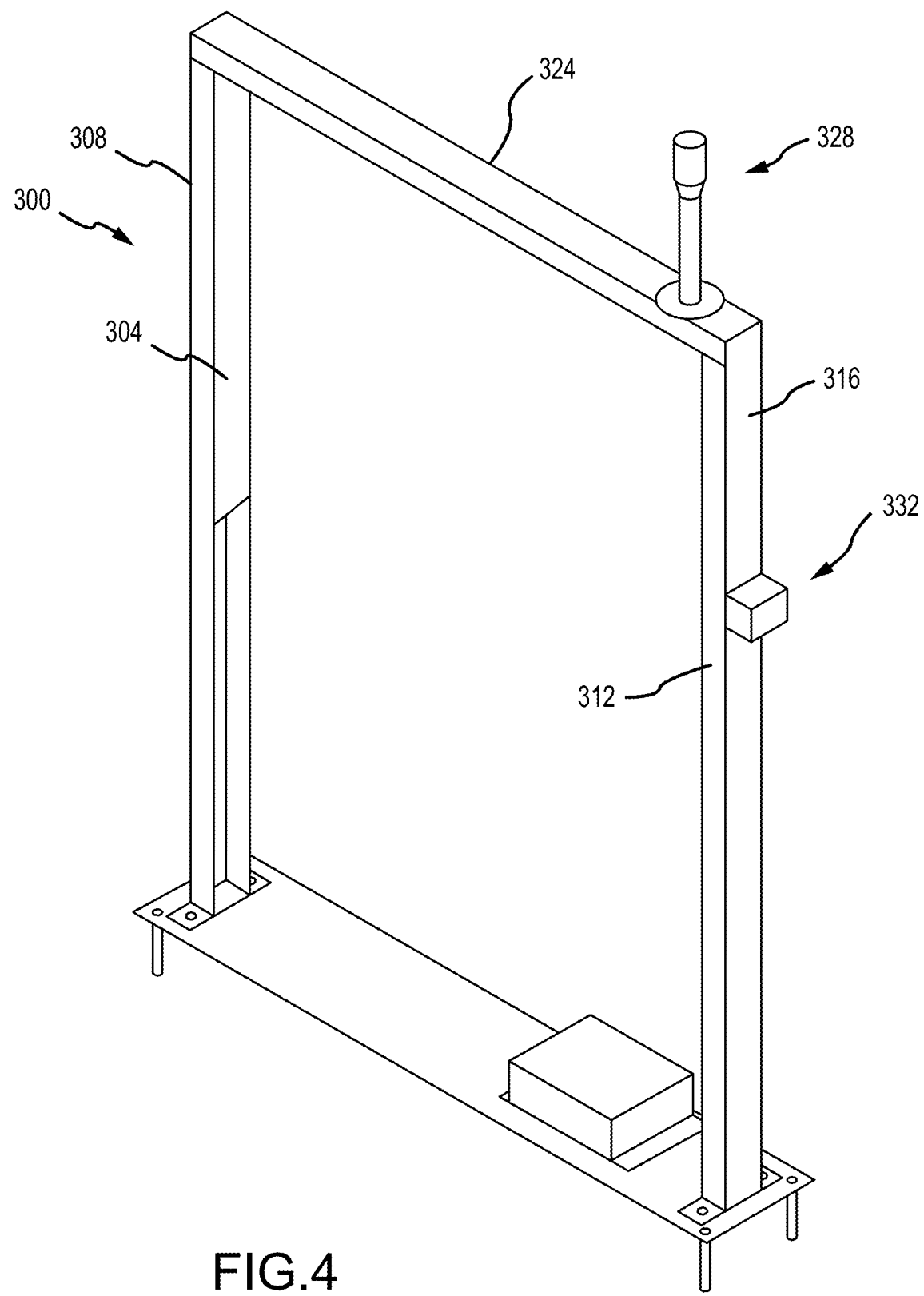
FIG. 4 illustrates another perspective view the package size detector of FIG. 1.
Figure 5:
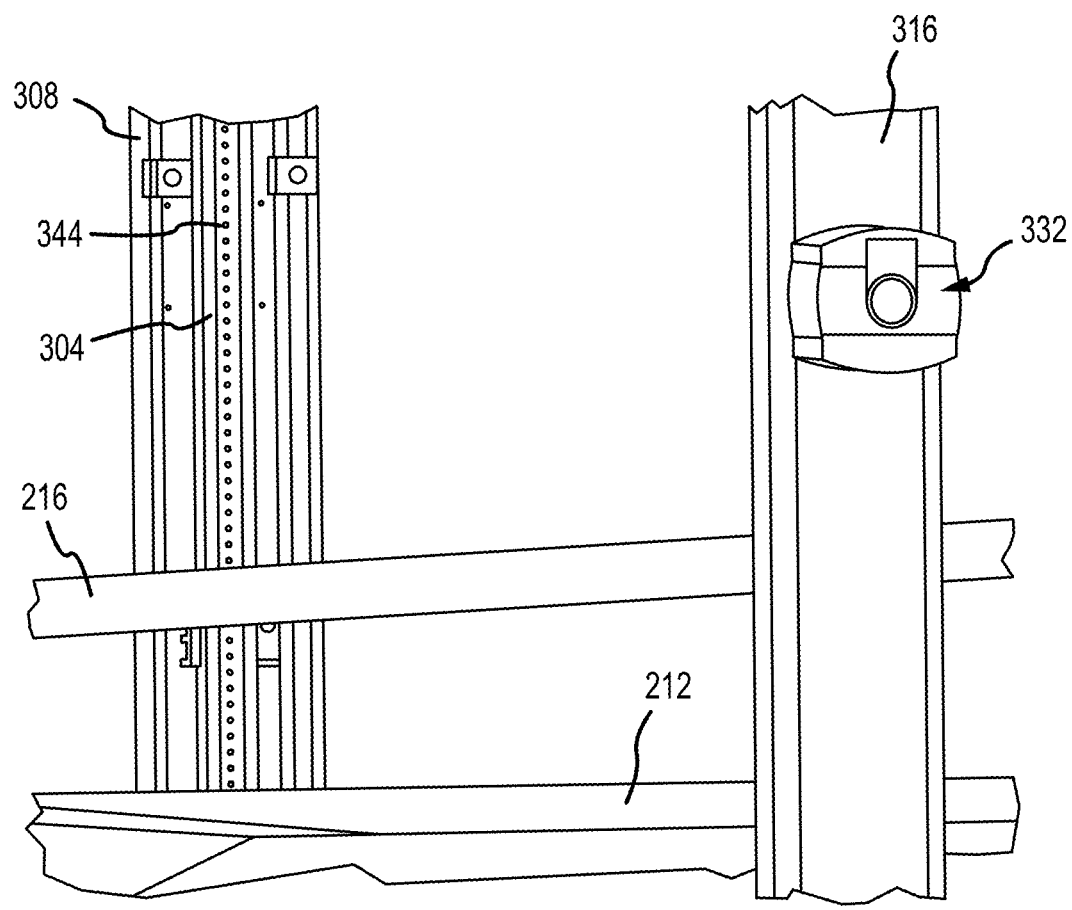
FIG. 5 illustrates another detailed perspective view the package size detector of FIG. 1.
Figures 6, 7:
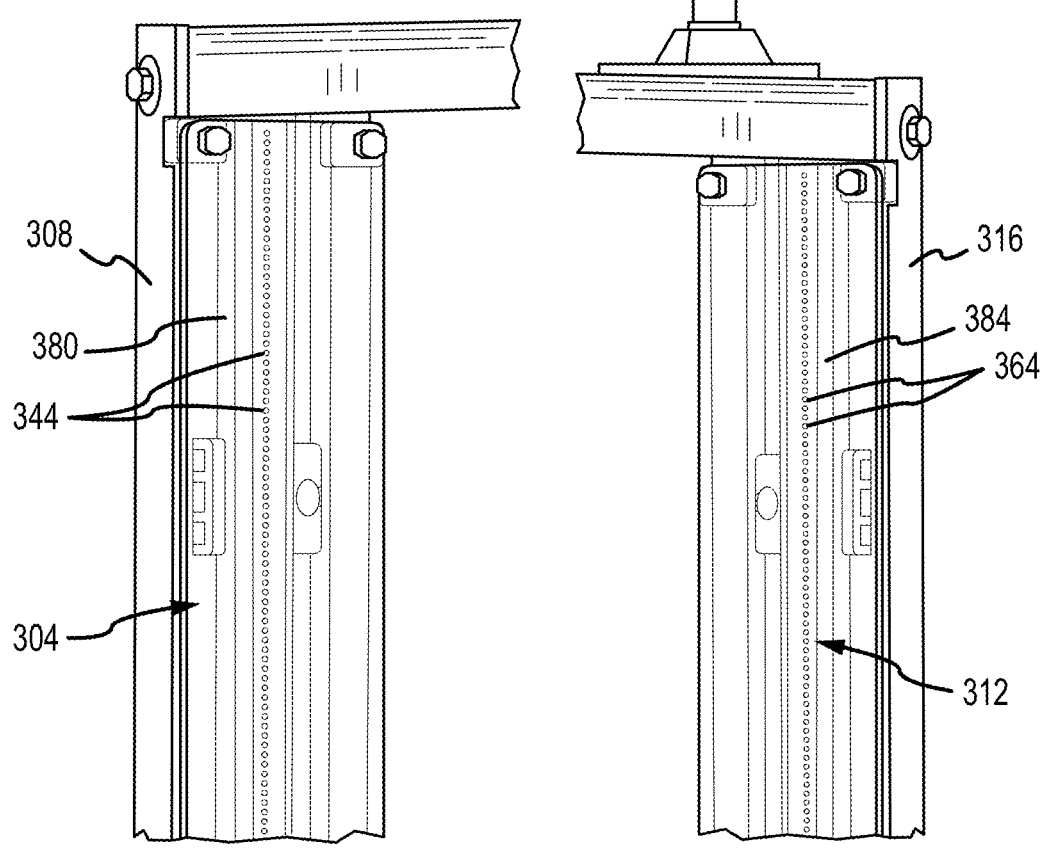
FIG. 6 illustrates another detailed perspective view the package size detector of FIG. 1.
FIG. 7 illustrates another detailed perspective view the package size detector of FIG. 1.
Figure 8:
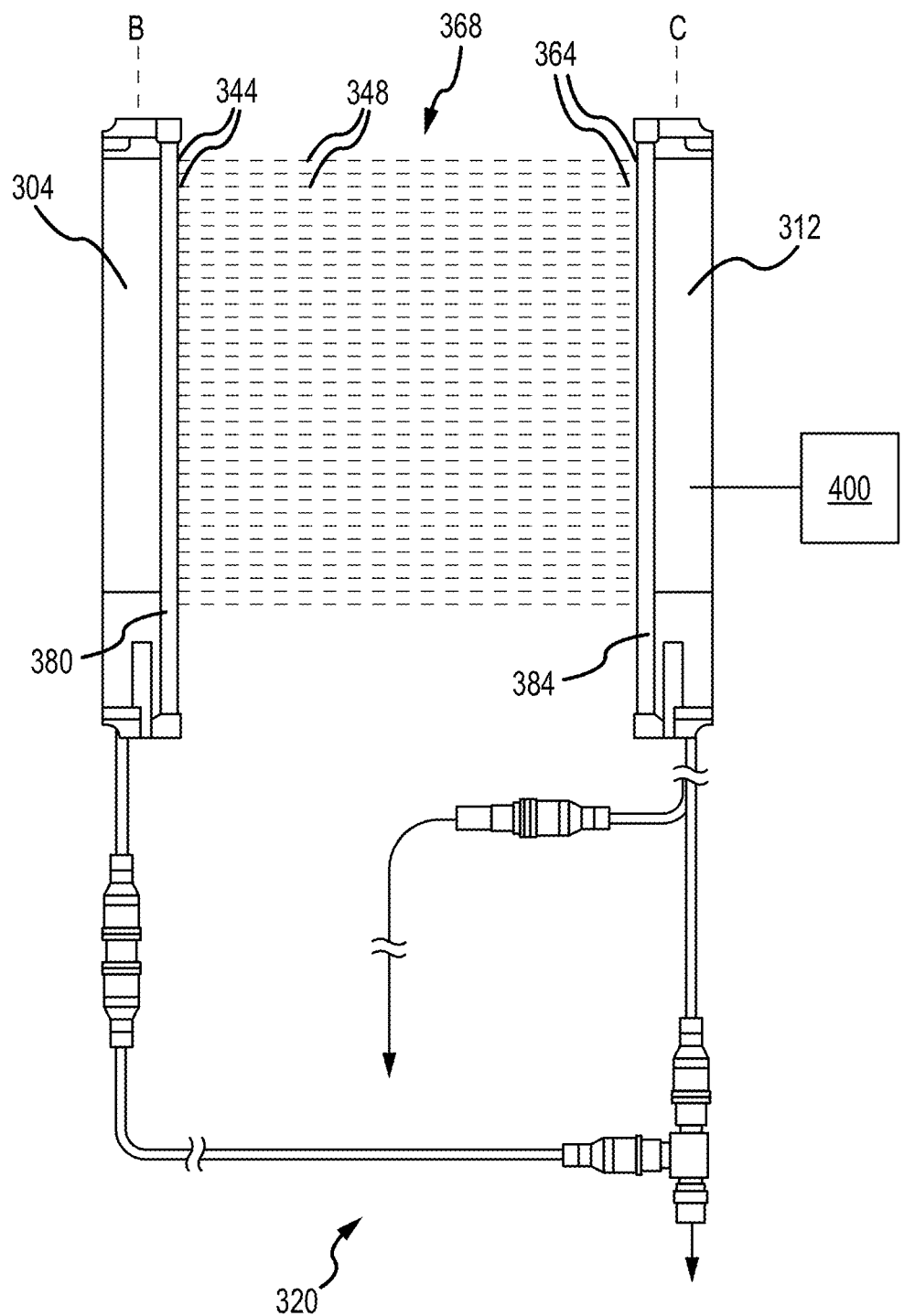
FIG. 8 is a schematic view of the package size detector of FIG. 1.

With respect to FIG. 4 and FIG. 5, the detector 300 may further comprise a "reset" actuator 332 (e.g., a button) that is in communication with the transmitter 304 and receiver 312. In the illustrated embodiment, the reset actuator 332 is positioned on the second support member 316, but in other embodiments, the reset actuator 332 may be positioned on the first support member 308, the connecting member 324, or remotely from the detector 366. Generally, the reset actuator 332 enables an operator to re-start the conveyor system at the package detector 300 after the oversized package has been cleared.

The transmitter 304 and the first support member 308 are positioned on a first side of the telescopic conveyor 114 and the receiver 312 and the second support member 316 are positioned on a second, opposite side of the telescopic conveyor 114. In the illustrated embodiment, the first support member 308 and the second support member 316 of the package size detector 300 are supported by the support surface and are positioned adjacent the base stage 200 of the telescopic conveyor 114. In some embodiments, the first support member 308 and the second support member 316 of the package size detector 300 are supported by the base stage 200. In some embodiments, a body of each of the transmitter 304 and receiver 312 is movably coupled to a bracket 380, 384 (FIGS. 6-7), which is coupled to the respective first support member 308 and second support member 316, such that the body may be adjustable relative to the bracket 380, 384. Additionally or alternatively, in some embodiments, the first support member 308 and second support member 316 may be telescopic support members that enable a height of the transmitter 304 and receiver 312, respectively, to be adjustable relative to the support surface and/or the telescopic conveyor 114.

Referring to FIGS. 4-8, the body of the transmitter 304 has an axis B (FIG. 8) and a plurality of light sources 344 (FIGS. 5 and 6) arranged along a length of the body. Each of plurality of light sources 344 is configured to emit a light beam 348. As arranged in the embodiments, each light beam 348 is emitted in a direction generally perpendicular to the axis B of the body. Also in the illustrated embodiment, the light emitted from each of the plurality of light sources 344 is constant.

In other embodiments, the light emitted may be pulsed at a given interval. Exemplary intervals may be between 0.01 second and 1 second; between 0.01 second and 0.5 second; or between 0.5 second and 1 second. For instance, light sources 344 may pulse light every 0.01 second; every 0.1 second; every 0.2 second; every 0.25 second; every 0.5 second; every 0.75 second; or every 1 second. Other pulse intervals are contemplated.

Similarly, the body of receiver 312 has an axis C (FIG. 8) and a plurality of sensors 364 (FIG. 6) coupled to the body and arranged along a length of the body. Each of the plurality of sensors 364 is configured to detect light emitted from the plurality of light sources 344 using various light receptive components. In the illustrated embodiment, each of the plurality of sensors 364 is substantially aligned with one of the plurality of light sources 344. The term "substantially" aligned as used herein means within 5 mm (+/−5 mm). Typically, the number of light sources 344 corresponds to the number of sensors 364.

When aligned, light from each of the plurality of light sources 344 extends from the respective light source on the transmitter 304 and is sensed by the respective sensor 364 on the receiver 312 when no object is between the light source 344 and sensor 364. Taken together, the emitted light from each of the plurality of light sources 344 collectively defines a light curtain 368 because the light extends between first support member 308 and second support member 316. In other words, the light sources 344, which in the illustrated embodiment are oriented respectively in vertically-arranged arrays, thus create a horizontal array of light beams 348 that extend substantially parallel to one another and generally transversely relative to the support surface and the slider bed 212.

In some embodiments, each receiver 312 may sense the light from the aligned light source 344 as well as light beams 348 of the light sources 344 adjacent to (e.g., above and/or below) the aligned light source 344.

Light sources 344 may be spaced apart at various intervals. Typically, light sources 344 are equally spaced along the length of transmitter 304. Sensors 364 may be spaced apart at various intervals. Typically, sensors 364 are equally spaced along the length of receiver 312. In some instances, a spacing between adjacent light sources 344 is equal to a spacing between adjacent sensors 364.

In various instances, adjacent light sources 344 may be spaced apart by between 1 mm and 7 mm. For example, the light sources 344 may be spaced about 1 mm; about 2 mm; about 3 mm; about 4 mm; about 5 mm; about 6 mm; or about 7 mm apart from one another. In various instances, sensors 364 may be spaced apart by between 1 mm and 7 mm. For example, the sensors 364 may be spaced about 1 mm; about 2 mm; about 3 mm; about 4 mm; about 5 mm; about 6 mm; or about 7 mm apart from one another. In other embodiments, the lights sources 344, the sensors 364, and the light beams 348 may be apart from one another by up to about 5 mm. In other embodiments, the lights sources 344, the sensors 364, and the light beams 348 may be apart from one another by at least about 2.5 mm.

In the illustrated embodiment, the lights sources 344 are infrared light sources and the sensors 364 are infrared sensors. In various instances, the wavelength of the light that is emitted and detected may be between 780 nm and 1000 nm. In some instances, the wavelength of the light that is emitted and detected may be 850 nm. In other embodiments, the light sources 344 and the sensors 364 may emit/sense a type of invisible light (e.g., light at any suitable wavelength such as ultrasonic, radio, etc.).

In the illustrated embodiment, the transmitter 304 and the receiver 312 are oriented such the light sources 344 and sensors 364 are used to measure and determine the height of the packages being moved by the conveyor belt 216. In other or alternative embodiments, the belt speed of the conveyor belt 216 may be used in connection with the light sources 344 and sensors 364 to measure the width of the packages. In still other or alternative embodiments, the transmitter 304 and receiver 312 may be oriented in other ways such that the light sources 344 and sensors 364 are used to measure a width or angle of the packages being moved by the conveyor belt 216.

For example, to measure the width of the package, in some embodiments (not shown) the receiver may be fixed to a location of the conveyor at one its distal ends, where a package is transferred to or from the conveyor, such that the receiver axis C may be oriented transverse to the slider bed. The transmitter may thus be supported above and parallel to the receiver such that the respective light sources and sensors are aligned in the width direction of the conveyor.

In the illustrated embodiment, the package size detector 300 includes a programmable logic controller (e.g., controller) 400 in communication with light sources 344 and sensors 364. In other embodiments, the controller 400 may be part of a central processing unit of a computer that is remote from, but in communication with, electrical components of the package size detector 300. Controller 400 of the package size detector 300 may also be in communication with, and configured to selectively send signals to, the status indicator 328 and/or the controller 228 of the telescopic conveyor 114.

Controller 400 may store one or more instructions that, when executed by a processor or processing unit, perform one or more package size monitoring operations. Exemplary operations are described in greater detail below with respect to method 800. But, broadly, controller 400 may store instructions that, when executed by the controller 400, cause the controller 400 to determine whether a package height exceeds a predetermined threshold and send a signal if the package height meets or exceeds the predetermined threshold.

Figure 9:
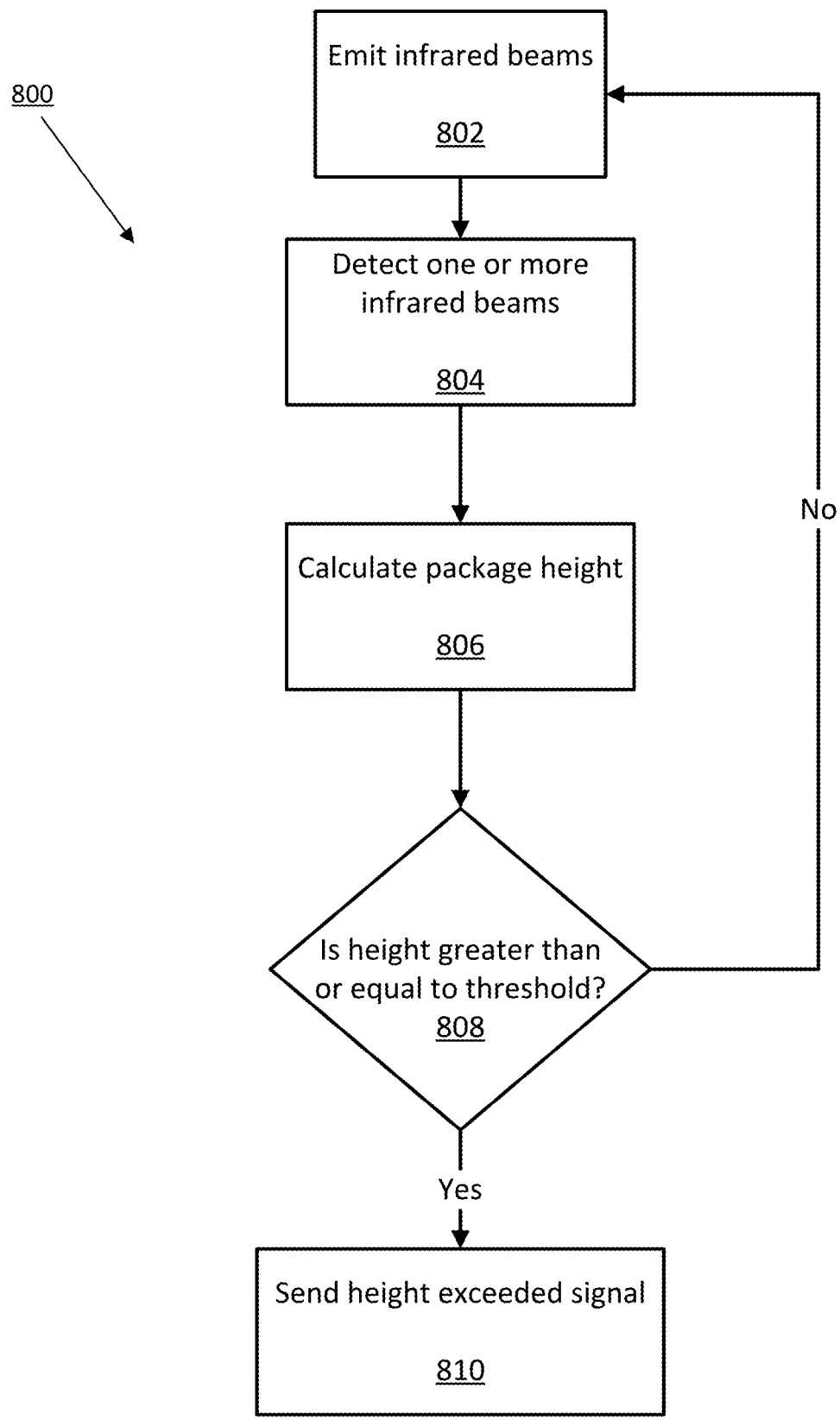
FIG. 9 illustrates a method for detecting a size of a package using the package size detector of FIG. 1.

An exemplary method 800 for monitoring a package on the telescopic conveyor 114 is shown in FIG. 9. Exemplary embodiments of package handling system 100 may be used to perform one or more operations of exemplary method 800, and part numbers of system 100 are referenced below for ease of discussion and without limitation.

The method 800 includes emitting a plurality of light beams 348 (operation 802). Typically, light beams emitted at operation 802 are infrared light beams. In an example implementation, each light source 344 emits light at the same time.

Method 800 also comprises detecting one or more of the emitted light beams (operation 804). As noted above, the transmitter 304 and receiver 312 are oriented generally vertically relative to the support surface and the slider bed 212 such that the light beams 348 extending therebetween are oriented transverse to the slider bed 212.

In an exemplary implementation, sensors 364 may be configured to indicate detection or non-detection of an emitted light beam. For instance, sensors 364 may be configured to output a first signal indicating detection of a light beam, and output a second signal indicating that no light is detected. As another example, sensors 364 may be configured to output a signal when light is detected and to cease transmitting that signal when no light is detected (or vice versa).

Method 800 may further include calculating a package height using the detected light beams (operation 806). To calculate the package height, the controller 400 of the detector 300 may determine a number of consecutive light beams 348 emitted from the respective light source 344 but that are not detected by the corresponding sensor 364. For instance, a package may block emitted light from being detected by the corresponding sensors 364. Each of the light sources 344 of the transmitter 304 and corresponding sensors 364 of the receiver 312 may establish a reference point for measurement of the height of the packages. Accordingly, regardless of where the conveyor belt 216 is positioned relative to the slider bed 212, the package height will be measured upwards from the lower-most blocked sensor 364.

The method further includes determining whether the package height meets or exceeds a predetermined threshold (operation 808). In some implementations, the controller 400 of the detector 300 may determine whether a package height is greater than or equal to a predetermined threshold (operation 808). The controller 400 of the detector 300 may determine whether the package height meets or exceeds a predetermined threshold by determining when the number of consecutive sensors 364 receiving no signal meets or exceeds the predetermined threshold of sensors 364 receiving no signal.

The predetermined threshold may be programmed into the controller 400 of the detector 300. The predetermined threshold may correlate a maximum package height to a consecutive number of light beams 348 emitted from the respective light source 344 that are not detected by the corresponding sensor 364.

For example, if an operator wants to detect packages having a height greater than 25 inches (635 mm), the predetermined threshold would be calculated to be 128 consecutive blocked light beams 348 and therefore 128 sensors 364 of the receiver 312 receiving no signal. This value may be determined using the following equation:

$$\text{Predetermined Threshold} = \frac{\text{max package height}}{\text{spacing between light beams}} + 1 = \frac{635 \text{ mm}}{5 \text{ mm}} + 1 = 128$$

Accordingly, the predetermined threshold is determined by the maximum package height (e.g., 25 in=635 mm) divided by the spacing between light beams (e.g., 5 mm). Although the maximum package height is 25 inches in the illustrated calculation, this maximum package height is merely exemplary. The maximum package height may be any suitable value (e.g., 20 inches to 35 inches). In some embodiments, the predetermined threshold may be between 63 cm (e.g., 24.8 inches) and 89 cm (e.g., 35.0 inches).

When the package height meets or exceeds the predetermined threshold, method 800 may comprise sending a signal indicating a height of the package meets or exceeds the predetermined threshold (operation 810). As used herein, a signal may comprise an electronic communication, an initiation of a signal transmission, and/or cessation of signal transmission, each of which may be interpreted as an indication that a package height has exceeded the predetermined threshold.

For example, if the package height is determined to be greater than or equal to the predetermined threshold, the controller 400 of the detector 300 may send one or more signals or electronic communications to controller 228 and/or status indicator 328. For instance, controller 400 may send a signal to the controller 228 of the telescopic conveyor 114. Upon receiving the signal, controller 228 may stop moving the conveyor belt 216. Controller 400 may send a signal to status indicator 328. Upon receiving the signal, the status indicator 328 may power the light and/or alarm of the status indicator 328. In some instances, when the package height does not meet or exceed the predetermined threshold, the controller 400 may send a signal indicating a height of the package 126 does not exceed the predetermined threshold.

In the illustrated embodiment, if the package height does not meet or exceed the predetermined threshold, method 800 may revert to operation 802 and continue monitoring the height of packages. In some instances, detector 300 continues to send a signal to controller 228 and/or status indicator 328 unless and until a package height exceeds the threshold. For instance, detector 300 may send a 24 Volt signal until the height is exceeded, at which point detector 300 stops sending the 24 Volt signal. In some instances, detector 300 only sends a signal to controller 228 and/or status indicator 328 when a package height exceeds the threshold.

Once the operator has removed the oversized package from the telescopic conveyor 114, the reset 332 button can be actuated (e.g., pushed) to allow the telescopic conveyor 114 and the detector 300 to resume operation.

Various features of the invention are set forth in the following claims.

What is claimed is:

1. A method for monitoring a package on a conveyor, the method comprising:
    emitting a plurality of infrared beams, wherein the infrared beams are emitted from a transmitter using a plurality of vertically-arranged light sources;
    detecting one or more of the infrared beams, wherein the infrared beams are detected by a receiver using a plurality of vertically-arranged sensors;
    calculating a package height using the detected infrared beams;
    determining whether the package height meets or exceeds a predetermined threshold; and when the package height meets or exceeds the predetermined threshold, sending a signal indicating a height of the package exceeds the predetermined threshold,
    wherein the package height corresponds to a consecutive number of the plurality of vertically-arranged sensors that receive no signal from the corresponding one of the infrared beams,
    wherein determining whether the package height meets or exceeds the predetermined threshold includes comparing the consecutive number of the plurality of vertically-arranged sensors that receive no signal to the predetermined threshold, and
    wherein sending the signal includes sending the signal when the consecutive number of the plurality of vertically-arranged sensors that receive no signal meets or exceeds the predetermined threshold.

2. The method of claim 1, wherein calculating the package height comprises determining a spacing between adjacent infrared beams.

3. The method of claim 1, wherein the infrared beams are emitted in a direction transverse to a package movement direction on the conveyor.

4. The method of claim 1, further comprising stopping a belt on the conveyor after receiving the signal.

5. The method of claim 1, further comprising powering a status indicator after receiving the signal.

6. The method of claim 1, wherein the plurality of vertically-arranged sensors have a known spacing.

7. The method of claim 1, wherein the predetermined threshold is between 63 cm and 89 cm.

8. A package size detector for monitoring a size of a package on a conveyor, the package size detector comprising:
    a transmitter positioned on a first side of the conveyor, the transmitter including a plurality of light sources, wherein each of the plurality light sources is configured to emit a light;
    a receiver positioned on a second, opposite side of the conveyor, the receiver including a plurality of light sensors, each of the plurality of light sensors being configured to detect light emitted from the plurality of light sources; and
    a controller storing instructions that, when executed by the controller, cause the controller to:
        determine whether a package height meets or exceeds a predetermined threshold, the package height corresponding to a consecutive number of the plurality of light sensors that receive no signal from the corresponding one of the plurality of light sources;
        compare the consecutive number of the plurality of light sensors that receive no signal to the predetermined threshold to determine whether the package height meets or exceeds a predetermined threshold, and
        send a signal when the consecutive number of the plurality of light sensors that receive no signal meets or exceeds the predetermined threshold.

9. The package size detector of claim 8, wherein the plurality of light sources are infrared light sources and the plurality of light sensors are infrared light sensors.

10. A package handling system comprising:
    a conveyor including a first side, a second side opposite the second side, a slider bed extending between the first side and the second side, a conveyor belt at least partially supported by and movable relative to the slider bed, and a controller; and
    a detector for monitoring a size of a package on a conveyor, the detector including:
        a transmitter positioned on a first side of the conveyor, the transmitter including a plurality of light sources, wherein each of the plurality light sources is configured to emit a light;
        a receiver positioned on a second, opposite side of the conveyor, the receiver including a plurality of light sensors, each of the plurality of light sensors being configured to detect light emitted from the plurality of light sources; and
        a controller storing instructions that, when executed by the controller, cause the controller to:
            determine whether a package height exceeds a predetermined threshold that corresponds to a maximum package height, wherein the package height corresponds to a consecutive number of the plurality of light sensors that receive no signal from the corresponding one of the plurality of light sources;

compare the consecutive number of the plurality of light sensors that receive no signal to the predetermined threshold to determine whether the package height exceeds the predetermined threshold, and send a signal when the consecutive number of the plurality of light sensors that receive no signal meets or exceeds the predetermined threshold.

11. The package handling system of claim 10, wherein the plurality of light sources are infrared light sources and the plurality of light sensors are infrared light sensors; and
wherein the controller of the conveyor is configured to receive the signal and stop the conveyor belt.

12. The package handling system of claim 10, wherein the detector further includes a status indicator that is in communication with the controller of the detector such that the signal is configured to power the status indicator to alert an operator.

\* \* \* \* \*